United States Patent [19]
Peron et al.

[11] 3,830,980
[45] Aug. 20, 1974

[54] DEVICE FOR CORRECTION OF SYNCHRONISATION FAULTS FOR A SWITCHABLE DATA TRANSMISSION NETWORK OPERATING ON A TIME SHARING BASIS

[76] Inventors: Roger J. Peron, Z.U.P. Batiment G.B., Lannion; Maurice J. Revel, Rue de Lanneg-Braz, Perros-Guirec, both of France

[21] Appl. No.: 345,853

[30] Foreign Application Priority Data

Mar. 31, 1972 France .............................. 72.11440

[52] U.S. Cl. ......................... 179/15 BS, 178/69.5 R
[51] Int. Cl. .............................................. H04j 3/06
[58] Field of Search ............. 179/15 BS; 178/69.5 R

*Primary Examiner*—Ralph D. Blakeslee
*Attorney, Agent, or Firm*—Abraham A. Saffitz

[57] ABSTRACT

A switchable transmission system operating by time-sharing for data carrying digital information, comprises a distant exchange and a local exchange, whereof the timers are not strictly synchronous, and means of correcting the relative drift of these timers. The system employs means for correcting the repetitions or omissions of synchronization words. Means are incorporated in the distant exchange for the transmission of blank words on each transmission line between data-carrying words. The local exchange comprises three shift registers grouped in cascade and chronologically staggered with respect to each other, means for scanning words carrying digital information and for selectively connecting these scanning means to the said registers. The connecting means are controlled by repetitions or omissions of synchronization words, and by the reception of the blank words, in such manner as to make use, as the case may be, of the first or second registers or of the third and first registers, depending on the kind of synchronization error observed.

2 Claims, 9 Drawing Figures

DEVICE FOR CORRECTION OF SYNCHRONISATION FAULTS FOR A SWITCHABLE DATA TRANSMISSION NETWORK OPERATING ON A TIME SHARING BASIS

The present invention relates to a system for the transmission and switching of digital data comprising one or more time-sharing exchanges.

In the switching exchanges of the time-sharing type, the time is divided into frames of which each comprises a plurality of time slots. In current practice, the frames commonly last for 125 microseconds and are divided into 22 slots of approximately 4 microseconds each.

The time slots contain words and the recurrent time slots having the same serial number in the consecutive frames, define a channel. The words contained in the time slots may be PCM words, representing recurrent samples of an analog signal, being a telephone signal, for example, or may be data-carrying words, that is to say groups of pulses cut out of a continuous flow of data or else data representing alphanumerical characters. The words contained in the initial slot of each frame are words of special structure serving the purpose of synchronization.

The division of the time into frames and into slots is performed in each exchange by means of the timing system or clock of the exchange. These clocks are not precisely synchronous in practice and undergo a slot drift with respect to each other; errors which remain to be described, are caused by this lack of synchronism.

Because of the asynchronism of the clocks in the time-sharing transmission and switching systems, slot relocation devices have been incorporated. The words contained in the slots arrive at the local exchange at a rate determined by the clock of the remote exchange and are transferred within the local exchange into a buffer register at instants determined by the remote clock. The contents of the buffer register are then transferred into a clock change register at one or the other of two possible instants dependent on the local clock, the choice of which, depends on the actual drift between the remote and local clocks. Finally, the contents of the clock change register are transferred into a frame relocating register at instants dependent on the local clock and differing from the two aforesaid possible instants.

When the drift of the local clock with respect to the remote clock reaches the duration of a time slot of the local exchange, a so-called slot jump intervenes, which will be described in detail in the following. This action results either in the repetition of the synchronizing word of a frame and a delay amounting to one time slot for all the words following this synchronizing word in the case in which the local clock leads as compared to the remote clock, or in the omission of the synchronizing word of a frame and an advancement amounting to one time slot for all the words following this synchronizing word in the case in which the local clock lags behind the remote clock.

Means are known for correcting the address counter which routes the words in the buffer registers of the switching network despite the lead or lag of a time slot imposed on them by the slot jump action. More particularly, the words being defined by addresses which consist in the serial numbers of the slots they occupy within the frame, the address counter routes the words occupying the first slots of each frame to the first buffer register, the words occupying the second slots of each frame to a second buffer register and so forth. If, as a result of a slot jump, the words of the channel previously occupying the second slots of the frames pass either into the first slots or into the third slots, means have been proposed which render it possible to route these to the second buffer register which is earmarked for them. Accordingly, there is no error in the spatial destination of the words, but the storage period of the words in the addressee buffer register may undergo a forward or backward time variation equal to the duration of one slot.

As will be described in the following, this time displacement by one slot of the instant of storage of a word in the addressee buffer register of the switching network causes a read-out error in the said buffer register. The same word may be scanned twice or its scanning may be omitted during a time slot.

This fault induces errors in time-sharing switching systems. These errors are not of significant import in the case in which the words are PCM coded samples of an analog voice signal, but are unacceptable in digital data transmission and switching networks.

According to the present invention there is provided a switchable system for transmission of data words carrying digital information wherein the transmission channels are time-sharing transmission channels comprising time slots grouped in frames, the said frames being identified by synchronizing words or bits in their leading time slots, and the exchanges are time-sharing exchanges wherein the clocks are asynchronous and drift with respect to each other, which in the transmission of data-carrying words introduce repetitions or omissions of synchronizing words and retardations or advances by one time slot of the data-carrying words caused by the slot jumps generated in the local exchange when the drift between the clock of the distant exchange originating the data-carrying words and the clock of the local exchange becomes equal to the duration of a time slot of the local clock, the said system comprising means situated at the distant exchange for the transmission of blank words, along each transmission channel and between data-carrying words, a delay shift register, a normal shift register and an advance shift register situated in cascade at the local exchange, and chronologically staggered with respect to each other by one time slot and adapted to receive the data coming from the distant exchange including blank words; means for scanning the data words carrying digital information; and means for selectively connecting the said scanning means to the said shift registers, the said connecting means rendering it possible to shift from the normal shift register to the advance shift register in the lead by a time slot over the said normal register when a repetition of a synchronizing word is introduced by a slot jump in such manner as to eliminate this repetition, and at each beginning of a frame and to shift from the normal shift register to the delay shift register trailing by one time slot behind the said normal register when an omission of a synchronizing word is introduced by a slot jump in such manner as to cancel this omission, and at each beginning of a period and to shift from the said advance and delay registers to the said normal register each time a blank word is received.

The words issuing from the frame relocation circuit comprised in all time-sharing exchanges, are received in three cascade registers correspondingly referred to as lead or advance, normal and lag or delay registers and set with a lag of one time slot with respect to each other, and the words transmitted to the buffer registers of the time-sharing switching network are scanned selectively in one of the three registers.

One free slot which is not occupied by a word, is recovered upon passing from the normal reigster to the delay register set with a lag of one time slot with respect to the normal register. A time slot occupied by a word is omitted upon passing from the normal register to the advance register which is in the lead by one time slot. It will be seen that by selective passing from one register to another, it is possible to relocate the words which had undergone a forward or backward displacement by one time slot in the slot they should have occupied in the absence of this displacement. The forward or backward displacement by one time slot of a word will be referred to in the following as a "partial slot jump" and more simply as "partial jump."

More particularly, when a slot jump induced by a lead of the local clock has caused the repetition of a synchronizing word, passing from the normal register to the advance register at the instant of the repeated synchronizing word eliminates this repeated word and advances all the following words by one time slot. Accordingly, it would seem that the problem raised has been resolved. Since a slot must be lost however by passing from one register to another in the lead with respect to the former at each slot jump, and since there are no more than three registers all told, it is necessary to return to the normal register after each shift to the lead register in order to make ready to process the next slot jump in the same direction. To this end, the position of the words within the frame which is taken as being definitive is that resulting from the slot jump, that is to say that the delay of one time slot inserted by the slot jump is rendered definitive, but the delay of one time slot applied to each word is established when this word is a blank word.

When a slot jump induced by lagging of the local clock has caused the omission of a synchronizing word, passing from the normal register to the lag register at the instant of the omitted synchronizing word restores this omitted word and delays all the following words by one time slot. Accordingly, it would seem that the problem raised had been resolved. Since a slot must be gained however by passing from one register to another lagging behind the former at each frame jump and since there are no more than three registers all told, it is a need to return to the normal register after each shift to the lag register in order to make ready to process the next slot jump in the same direction. To this end, the position of the words within the frame which is taken as being definitive is that which results from the slot jump, that is to say that the lead of one time slot inserted by the slot jump is rendered definitive, but the advance of one time slot applied to each word is established when this word is a blank word.

The invention will now be described in more detail by way of example only, with reference to the accompanying drawings, in which:

FIG. 1 illustrates a frame relocation device of the prior art within a time-sharing exchange;

FIGS. 2*a* and 2*b* depict the repetition and the omission of the synchronizing word caused by a slot jump;

Figure 5A:
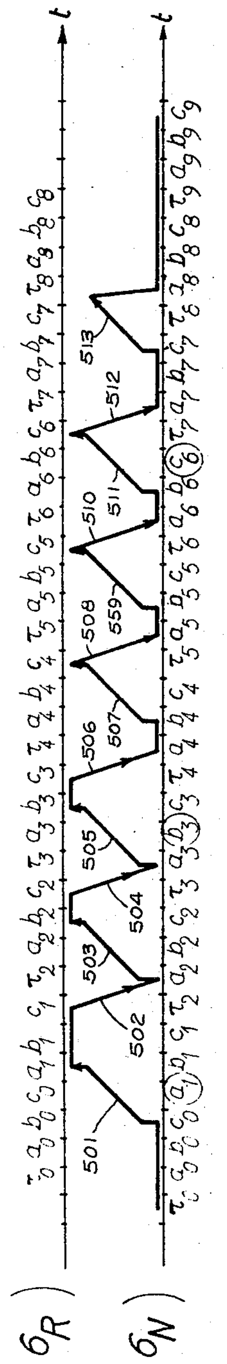
Figure 5B:
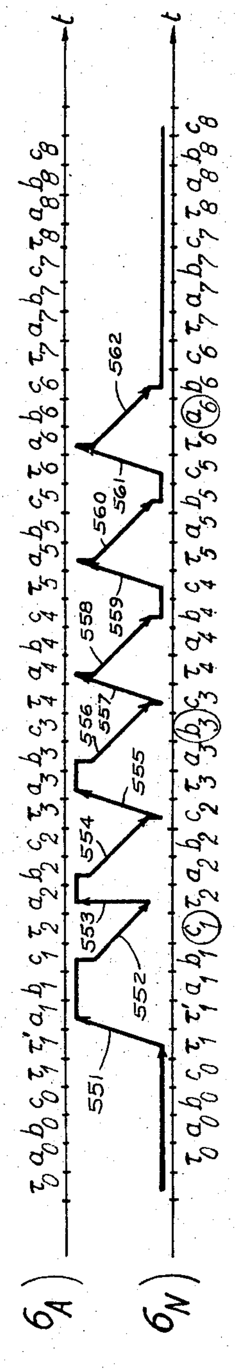
Figure 6:
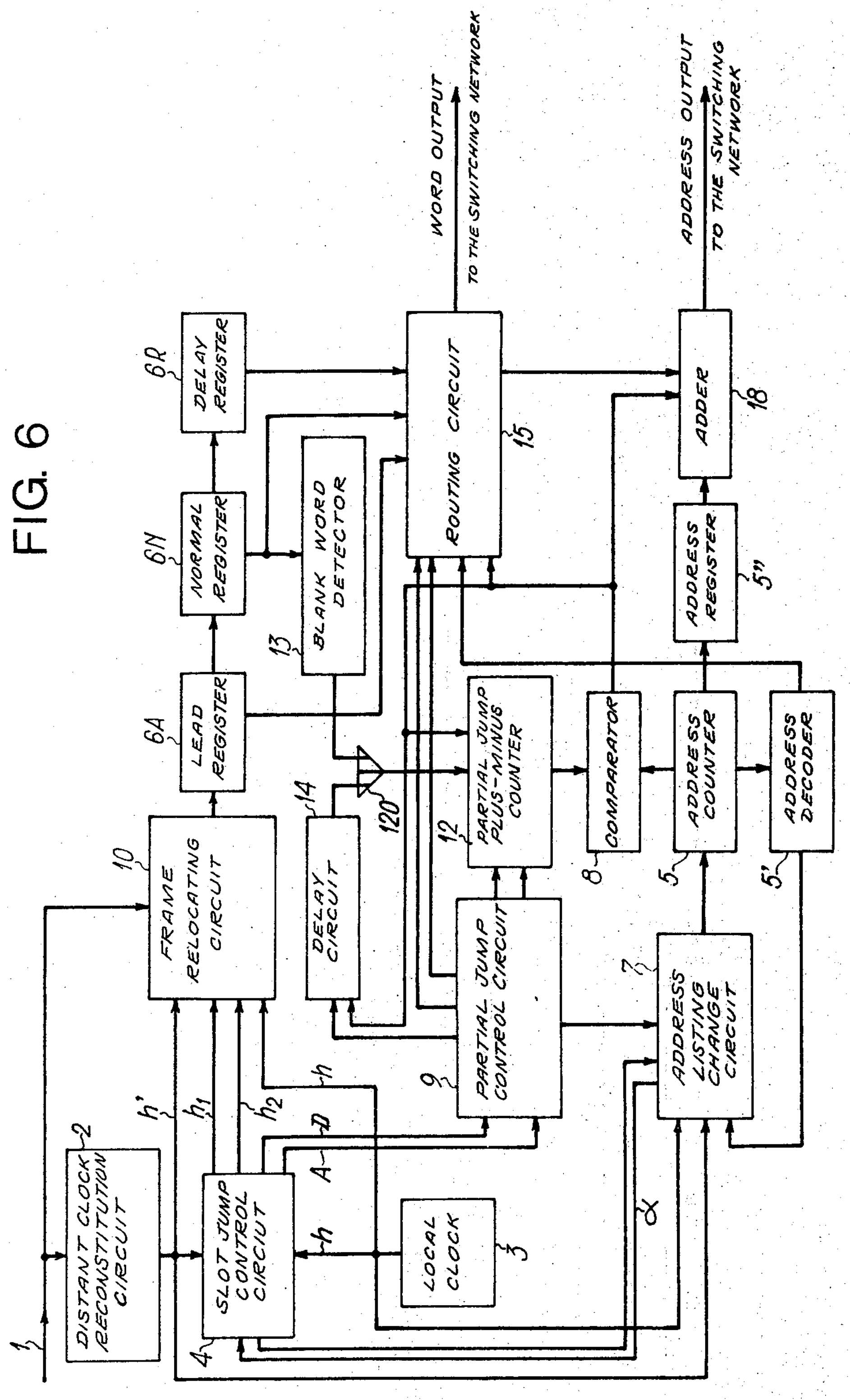
Figure 7:
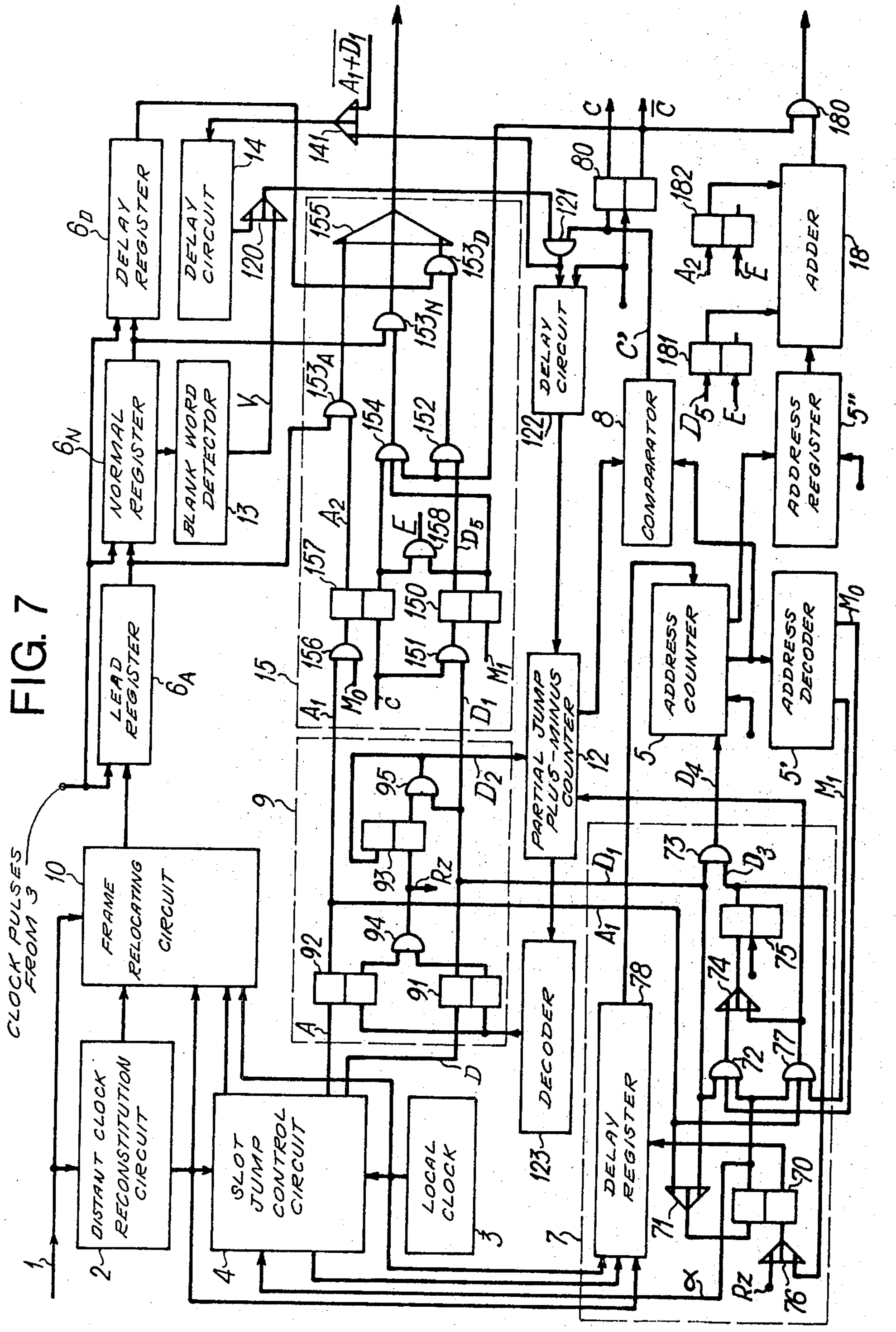

FIGS. 5*a* and 5*b* illustrate the partial slot jumps performed within the switchable data transmission system in accordance with the invention;

FIG. 6 illustrates the system of partial slot jumps of the invention in the form of a block diagram; and FIG. 7 illustrates this same system in detail.

Figure 1:
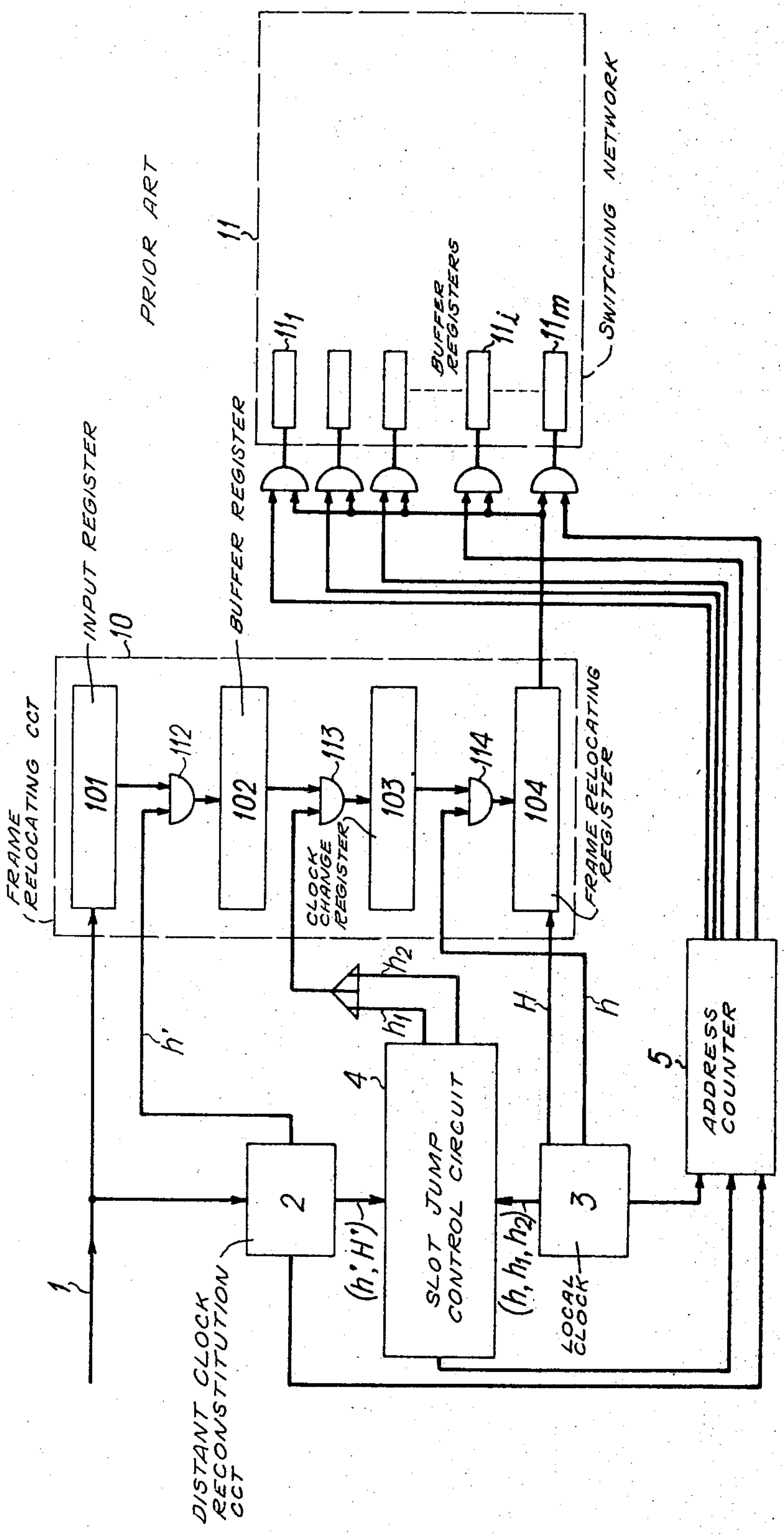

In respect of FIGS. 1, 2*a* and 2*b*, reference will first be made to the manner in which the slot jumps appear in the time-sharing transmission and switching systems of the prior art.

An incoming line 1 is connected to a circuit 2 for synchronization or reconstitution of the distant clock, and to a frame relocation circuit 10. This device comprises four registers 101 to 104, the first being connected to the incoming line 1 in series and all four being connected in parallel between them from 101 to 102, from 102 to 103 and from 103 to 104.

The distant clock reconstitution circuit 2 and a local clock 3 are connected to a slot jump control circuit 4. The distant clock reconstitution circuit 2 generates small pulses $h'$ coincining with the end of the time slots and larger pulses H' defining windows and centered on the pulses $h'$. The local clock 3 generates pulses $h$, $h_1$ and $h_2$ at the frequency of the slots, these pulses being distributed during the time of a slot and the interval between $h_1$ and $h_2$ amounting to half the duration of a slot. In view of the asynchronism of the clocks, the period of the pulses $h$ is not precisely equal to the period of the pulses $h'$; it may be shorter, in which case the local clock advances as compared to the distant clock, or longer, in which case the local clock lags behind the distant clock.

The transfer from the buffer register 102 to the clock change register 103 is performed through AND gates 113 actuated by the pulses $h'$. The transfer from the clock change register 103 to the slot relocating register 104 is performed through AND gates 114 selectively actuated by the pulses $h_1$ and $h_2$ as will be described, and the shift from the slot relocating register 104 to the buffer registers $\mathbf{11}_1$ to $\mathbf{11}_m$ of the switching network 11 is performed in series under the action of the local clock of the exchange.

The slot jump control circuit 4 receives the pulses $h'$ and H' from the distant clock reconstitution circuit 2, and the pulses $h$,$h_1$ and $h_2$ from the local clock.

Figure 2A:
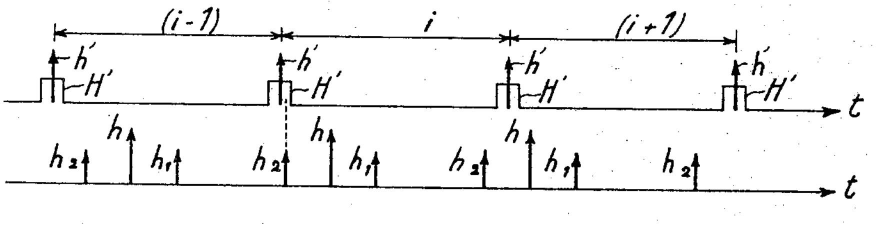

With reference to FIG. 2*a*, in which the local clock is in advance, it is apparent that neither $h_1$ nor $h_2$ coincides with H' in the first slot containing the word $(i-1)$; the word is transferred at $h_2$ into the clock change register 103, and at $h$ after $h_2$ into the slot relocating register 104. The word $(i-1)$ is thus certainly scanned once. Within the slot containing the word $i$, the pulse $h_2$ is positioned in the window H'. In this case, the slot jump control circuit 4 imposes $h_1$ instead of $h_2$ as the transfer pulse into the register 103, for the following words. In these conditions, the word $i$ is transferred at $h_2$ into 103 and at $h$ into 104. It is again transferred at $h_1$ into 103 and again at the following $h$ into 104. The word $i$ is thus scanned twice within its slot and within the following slot. The slot jump control circuit is organised so that the word repeated in the case of a slot jump consists of just the synchronizing word. The words of a time-sharing transmission and switching system having four channels or slots per frame numbered 0, 1, 2, 3, one being a synchronizing channel and three being data channels, have been illustrated on line a in FIG. 3. The words are designated by $\tau$ in the synchronizing channel and by $a$, $b$, $c$ in the data channels. The line illustrates eight frames $T_0$ to $T_7$. It is apparent from line $b$ that the synchronizing word $\tau_1$ of the second frame $T_1$ has been repeated at $\tau'_1$.

Figure 2B:
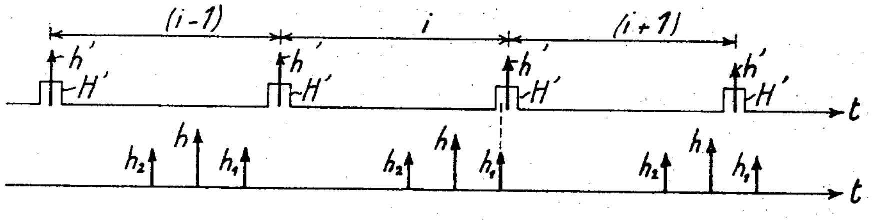

With reference to FIG. 2*b* in which the local clock lags, it is apparent that, within the first slot containing the word $(i-1)$, neither $h_1$ nor $h_2$ coincides with H'; the word is transferred at $h_1$ into the clock change register 103, and at $h$ following $h_1$, into the slot relocating register 104. Accordingly, the word $(i-1)$ is certainly scanned once. Pulse $h_1$ is positioned in the window H' within the slot containing the word $i$. In this case, the slot jump control circuit imposes $h_2$ instead of $h_1$ as the transfer pulse into the register 103 for the following words. In these conditions, the word $i$ transferred at $h_1$ into the register 103 is replaced during the next $h_2$ pulse in this same register by the word $(i+1)$. Accordingly, it is not transferred into the register 104 and is dropped. The slot jump control circuit is organized to omit no more than one frame synchronizing word in case of a slot jump.

Figure 3:
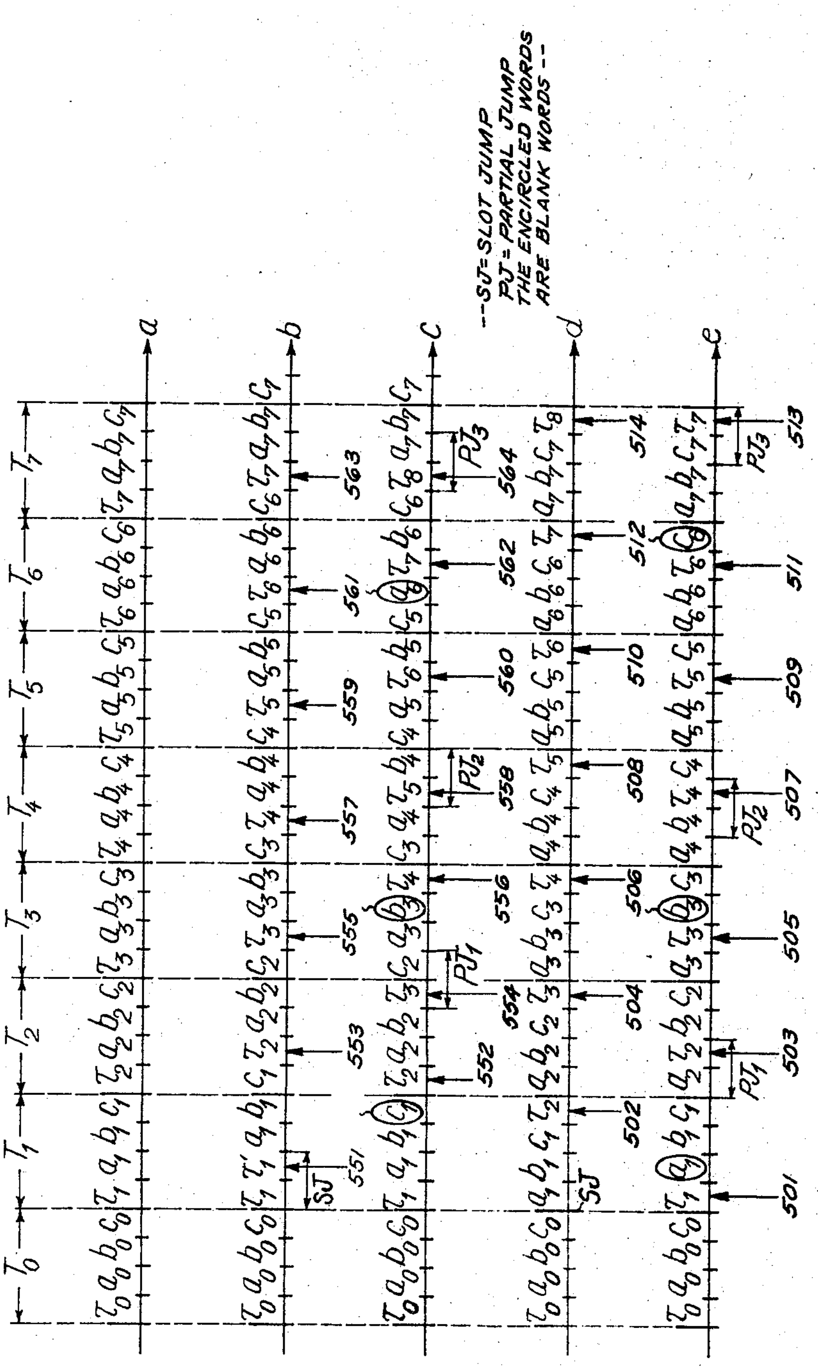
FIG. 3 illustrates the lag and lead by one time slot of all the words of a flow of data caused by a slot jump.

In FIG. 3 it is apparent from line $d$ that the frame synchronizing word $\tau_1$ of the second frame $T_1$ has been omitted. As for the rest, the notations are the same as on the lines $a$ and $b$ already described.

It is plain from the preceding statements, that a slot jump causes either the repetition of a synchronizing word, or its omission. The following words have an address changed by one unit.

It is known from the prior art that, by virtue of an address register wherein the address sequence is modified at each slot jump, the words may be routed to the buffer registers of the switching network for which the words are intended, despite the change in the address of these.

It will be understood however that although the words are routed to the buffer registers for which they are intended, errors intervene as a result of the change of time slot.

Figure 4:
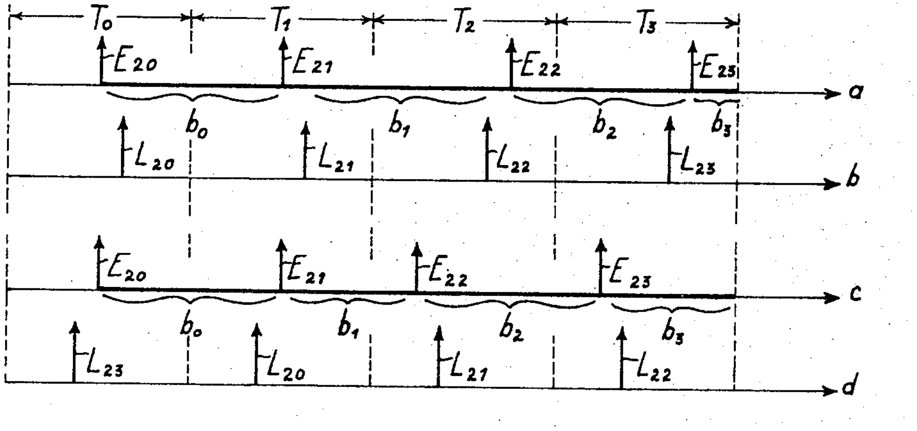
FIG. 4 illustrates the repetition and the omission of a data-carrying word within the switching network, caused by a slot jump.

With reference to FIG. 4, four frames $T_0$, $T_1$, $T_2$ $T_3$ have been illustrated, and on line a have been shown the instants of storage in the buffer register $11_2$ of the switching network of a word having this buffer register as its address, that is to say the word which is present in the third time slot of the frame in the absence of a slot jump. The word $b_0$ is stored in $E_{20}$, the word $b_1$ in $E_{21}$, and since a slot jump by advance of the local clock has occurred and caused a delay of one time slot, the word $b_2$ is stored in $E_{22}$ and the word $b_3$ in $E_{23}$.

The scanning or read out instants coordinated with the operation of the time-sharing switching network are fixed and recurrent (line $b$, FIG. 4). It is apparent that the word $b_0$ is scanned at $L_{20}$, but that by contrast — the word $b_1$ is scanned twice at $L_{21}$ and $L_{22}$ in the frames $T_1$ and $T_2$, and the term $b_2$ is scanned once only during frame $T_3$, in $L_{23}$.

On line $c$, the instants of storage in the buffer register of the switching network consist correspondingly of $E_{20}$, $E_{21}$ for $b_o$, $b_1$, a slot jump then having occurred by delay of the local clock and having caused an advance by one time slot, the words $b_2$ and $b_3$ are stored in $E_{22}$ and $E_{23}$. As on line $b$, the scanning instants (line $d$) are $L_{20}$, $L_{21}$, $L_{22}$, $L_{23}$. It is apparent that $b_1$ is not scanned at all.

The result thereof is that a slot jump which by virtue of an appropriate structure of the address counter does not cause channel crosstalk, has as its consequence repeated words or omitted words which, whilst insignificant in pulse code modulation telephone transmission, are unacceptable in the case of data transmission.

In FIG. 5*a*, the consecutive words which appear in the normal register $6_N$ are shown in line $6_N$, and the consecutive words which appear in the delay register $6_D$ are shown in line $6_D$. These words form one and the same sequence in both lines, the words on line $6_D$ being delayed by one time slot with respect to the identical words on line $6_N$.

The words to be routed to the buffer registers of the switching network, are selectively scanned either in the register $6_D$ or in the register $6_R$. Allowance is made for the fact that the shift from one word of the normal register to the word following the same in the sequence but stored in the delay register renders it possible to have available a blank time slot which serves the purpose of transmitting unused blank words which are considered as being synchronizing words in the following. As a matter of fact, the synchronizing words are in use upstream of the slot jump control circuit and are unused at the spot at which they are produced. By contrast, the shift from a word of the delay register to the word following the same in the sequence but stored in the normal register, is impossible. One term is lost in this direction of shift.

When the slot jump control circuit detects a period jump by delay (the local clock lags), it sets up $a$"shift from the register $6_N$ to the register $6_D$". During this shift is restored the synchronizing word whereof the omission has been caused by the jump ($\tau_1$, FIG. 5*a*). The scanning operation continues to occur in the register $6_D$ until the detection of a blank word, or more precisely until the word delayed by one frame with respect to the blank word. The operation reverts to the register $6_N$ at the address 1 of each period and remains in the same until the word following the blank word of a period.

It is apparent from FIG. 5*a* that the shift to the register $6_N$ occurs in $a_2$, $a_3$, $a_4$, $a_5$, $a_6$, $a_7$ (words having the address 1). The shift to the register $6_D$ occurs again at the word following the blank word detected after an interval of one frame. The blank word of the first channel is $a_1$; the shift from register $6_N$ thus occurs in $a_2$, $a_3$ until a blank term is detected in the second channel: $b_3$, after the partial jump of the first channel has been performed. The shift from the register $6_N$ occurs in $b_4$, $b_5$, $b_6$ until a blank word is detected in the third channel: $c_6$, after the partial jump of the second channel has been performed. The shift from the register $6_N$ occurs in $c_7$ to perform the last partial jump and the return shift to this register occurs in $a_8$.

Each jump from the delay register $6_D$ to the normal register $6_N$ results in the loss of the synchronizing word of the frame concerned. Each jump or each sequence of jumps from the normal register to the delay register results in the substitution for a blank word of a synchronizing word. Referring to lines $d$ and $e$ of FIG. 3 and to FIG. 5*a*, the following steps are obtained:

jump 501 — insertion of $\tau_1$ in slot No. 0
inverted jump 502 — loss of $\tau_2$
jump 503 — insertion of $\tau_2$ in slot No. 1 inverted jump 504 — loss of $\tau_3$
jump 505 — insertion of $\tau_3$ in slot No. 1
inverted jump 506 — loss of $\tau_4$
jump 507 — insertion of $\tau_4$ in slot No. 2
inverted jump 508 — loss of $\tau_5$
jump 509 — insertion of $\tau_5$ in slot No. 2
inverted jump 510 — loss of $\tau_6$
jump 511 — insertion of $\tau_6$ in slot No. 2
inverted jump 512 — loss of $\tau_7$
jump 513 — insertion of $\tau_7$ in slot No. 3
inverted jump 514 — loss of $\tau_8$ Thus seven complete jumps are used for a complete rearrangement of the frame although only four complete jumps are needed. The reason if that the insertion in a slot of a given serial number is repeated until a blank word is available in the slot of the following serial number.

It should be taken into account that when scanning operations are performed on the delay register, the addresses of the words should be reduced by one unit.

In FIG. 5*b*, the consecutive words which appear in the normal register $6_N$ are shown in line $6_N$, and the consecutive words appearing in the lead register $6_A$ are shown in line $6_A$. These words form one and the same sequence on both lines. The words of line 6A being in the lead by one time slot over the identical words of line $6_N$.

The words to be routed to the buffer registers of the switching network are selectively scanned either in the register $6_N$ or in the register $6_A$. Allowance is made for the fact that the shift from a word of the lead register to the word following the same in the sequence but stored in the normal register renders it possible to have available a blank time slot which, in point of fact, serves the purpose of transmitting unused blank words which are considered as being synchronizing words in the following. By contrast, the shift from a word of the normal register to the word following the same in the sequence but stored in the lead register, is impossible. One term is lost in this direction of shift.

When the slot jump control circuit detects a slot jump by advance (the local clock leads) it sets up a "shift from the register $6_N$ to the register $6_A$". During this shift of $\tau_1$ (register $6_N$) to $a_1$ (register $6_A$), the repeated synchronizing word $\tau'_1$ is suppressed.

The scanning operation continues in the register $6_A$ until the detection of a blank word or more precisely until the word delayed by one frame with respect to the said blank word. The shift to the register $6_A$ occurs again at the address 0 of each frame (which represents the address 1 for the register $6_A$) and the operation remains in the same until the word following the blank word after an interval of one frame.

It is apparent from FIG. 5*b* that the shift of the register $6_A$ occurs in $a_1$, $a_2$, $a_3$, $a_4$, $a_5$, $a_6$ (words having the address 1 in 6A and the address 0 in 6N). The shift to the register $6_N$ occurs at the word following the blank word detected after an interval of one frame.

Each jump from the normal register $6_N$ to the lead register $6_A$ results in the loss of the synchronizing word of the frame concerned. Each jump or each sequence of jumps from the lead register to the normal register results in the substitution for a blank word of a synchronizing word. Referring to lines *b* and *c* of FIG. 3 and to FIG. 5*b*, the following steps are obtained:

jump 551 — loss of $\tau'_1$
inverted jump 552 — insertion of $\tau_2$ in slot No. 0
jump 553 — loss of $\tau_2$
inverted jump 554 — insertion of $\tau_3$ in slot No. 3
jump 555 — loss of $\tau_3$
inverted jump 556 — insertion of $\tau_4$ in slot No. 3
jump 557 — loss of $\tau_4$
inverted jump 558 — insertion of $\tau_5$ in slot No. 2
jump 559 — loss of $\tau_5$
inverted jump 560 — insertion of $\tau_6$ in slot No. 2
jump 561 — loss of $\tau_6$
inverted jump 562 — insertion of $\tau_7$ in slot No. 2
jump 563 — loss of $\tau_7$
inverted 564 — insertion of $\tau_8$ in slot No. 1

Thus seven complete jumps are used for a complete rearrangement of the frame although only four complete jumps are needed. The reason if that the insertion in a slot of a given serial number is repeated until a blank word is available in the slot of the preceding serial number.

It should be taken into account that the addresses of the terms should be increased by one unit upon performing the scanning operations on the lead register.

In FIG. 6 are again found the incoming line 1, the circuit 2 for reconstitution of the distant clock, the local clock 3, the slot jump control circuit 4. the frame relocating circuit 10 and the address counter 5, which have been described with reference to FIG. 1. Whereas the output side of the frame relocating circuit 10 was connected to the buffer registers of the switching network 11 in FIG. 1, it is now connected to three cascade registers $6_A$, $6_N$, $6_D$ correspondingly referred to as the lead register, the normal register and the delay register. The words received, which may or may not have undergone slot jumps, that is to say whereof the frame comprises zero, one or two synchronizing words, are stored during a first slot in the lead register $6_A$, during the following slot in the normal register $6_N$, and during the following slot in the delay register $6_D$.

The address counter 5 designates the addresses of the words contained in the normal register $6_N$. These same words, when comprised in the register $6_A$, have an address increased by one unit, and then comprised in the register $6_D$, they have an address reduced by one unit.

When a slot jump occurs, in addition to the conversion of the transfer pulses $h_1$ into transfer pulses $h_2$ or vice-versa a pulse is transmitted by the slot jump control circuit 4 to the partial jump control circuit 9. The partial jump control circuit sets a partial jump counter 12 either at 1 or at 31 if there are thirty two slots 0–31 depending on whether the slot jump results from a delay or from an advance of the local clock as compared to the distant clock.

A blank word detector 13 is connected to the normal register $6_N$ and to the progression terminal of the plus-minus counter 12. A delay circuit 14 is connected between the partial jump control circuit and the counter 12 to make provision for the case in which the blank word detector 13 had not detected any blank word during a predetermined period. This is the case in which the words appearing in the registers $6_A$, $6_N$, $6_D$ are PCM terms and not terms carrying digital data. An error on the telephone channel is then the result thereof, and this is of little import as has been seen.

The scanning of the words issuing from the frame relocating circuit may be performed in the three registers $6_A$, $6_N$, $6_D$. The selection of a given scanning register is performed by means of a routning circuit 15.

The address counter 5 is controlled by the address listing change circuit 7 in such manner as to produce the series of addresses . . . 30, 31, 0, 0, 1, 2 . . . (address 0 is duplicated) in the case of a slot jump by advance of the local clock, and the series of addresses . . . 30, 31, 1, 2 . . . (address 0 is omitted) in the case of a slot jump by delay of the local clock. The address counter 5 is coordinated with an address decoder 5' and an address register 5'', this latter providing the address in series. The address listing change circuit 7 is connected to the slot jump control circuit 4 and to the address decoder 5' to establish the address listing changes needed in accordance with the occurrence of a slot jump by advance or delay.

The minus-plus partial jump counter 12 and the address counter 5 are both connected to a comparator 8 which delivers an output signal when the two addresses marked by 12 and 5 are identical. This output signal serves the purpose of controlling the routing circuit 15, the plus-minus partial jump counter 12, the delay circuit 14 and an adder 18 which increases or decreases the address given by the address register 5'' by one unit. The routing control circuit 15 equally has an output terminal leading to the adder 18.

FIG. 7 differs from FIG. 6 merely in that particular circuits 7, 8, 9, 12 and 15 are now illustrated in greater detail.

It has been observed in the foregoing that the slot jump control circuit 4 makes the decision whether a slot jump has occurred when one or the other of the two pulses $h_1$ or $h_2$ falls within a window H'. When it has detected the conditions of the slot jump however, the circuit 4 does not implement this immediately by substitution of the pulses $h_1$ for the pulses $h_2$ or vice versa, but begins by transmission to the partial jump control circuit 9 of a signal A (advance) or of a signal D (delay) depending on whether the slot jump is caused by an advance or by a delay of the local clock as compared to the distant clock.

Let us begin with the signal D. It has been observed that, in this case, a synchronizing term $\tau_1$ (line *d*, FIG. 3) is omitted. The signal D establishes the state one of the flipflop 91 of the partial jump control circuit 9. This flipflop transmits a signal marked $D_1$. The flipflop 93 having been deactivated beforehand as will be seen further on, AND gate 95 is unblocked and a signal marked $D_2$ sets up the plus counting direction for the plus-minus partial jump counter 12 and enters 1 into this counter; it also restores the flipflop 93 to the state o n e which blocks the AND gate 95.

Through the OR gate 71, the signal $D_1$ produces the state one of the flipflop 70 of the address listing change circuit 7 controlling the address counter 5. At the same time, it makes ready for the unblocking of the AND gates 72 and 73. The flipflop 70 delivers the signal $\alpha$ which is fed, to the slot jump control circuit 4 to transmit to the same the command to perform the said slot jump (substitution of $h_1$ for $h_2$ or vice versa).

Since the signal term $\tau_1$ is omitted, the word address counter 5 which in the absence of this omission would have to count the addresses 30, 31, 0, 1 . . . should supply the addresses 30, 31, 1 . . . since the $\tau$ of each frame are in the address slot 0. It is thus necessary to skip the address 0. To this end, the pulse $M_o$ having the address 0 issuing from the decoder 5' is fed to the AND gate 72 for whose unblocking preparation is made by the signal $D_1$ and $\alpha$, and through the OR gate 74 causes the activation of the flipflop 75. This flipflop transmits a signal $D_3$ which, through the AND gate 73 unblocked by the pulse $D_1$, feeds the work address counter 5 with a signal which sets the same at o n e. At this instant, it is the word $a_1$ which is situated in the normal register $6_N$. It has been assumed that this was a blank word (FIG. 3, line *e*). The signal $D_3$ deactivates the flipflop 70, which suppresses the signal $\alpha$ which had lost its usefulness since the slot jump had taken place.

The word $a_1$ is recognized as a blank word by the blank word detector 13. The latter feeds a pulse V to the plus-minus partial jump counter 12 through the OR gate 120, the AND gate 121 and the delay circuit 122 (this latter is a shift register); the minus-plus counter 12 is not set at position 2, therefore. It remains at the position 1 and does not pass to 2 until the next frame. At this instant, the plus-minus counter 12 and the address counter 5 are both positioned at one. The comparator 8 then transmits a signal C, having the duration of a time slot which imposes the state o n e on the flipflop 80 and is fed to the AND Gate 121 to open the same. If another blank word appears in the blank word detector 13, it may pass through the gate 121 but, because of the shift register 122, this next blank word will not shift the plus-minus counter 12 from 1 to 2 until the next frame. No more than one blank word per frame is considered, therefore.

The signal $D_1$ activates the flipflop 150 through the AND gate 151 unblocked by the signal C. The signal $D_4$ resulting therefrom unblocks the AND gate 152 except whilst the signal C persists. In other words, in the course of the duration of the time slots occupied by blank words the gates 152 and 154 are blocked, which blocks the gates 153D and 153N at the output side of the registers $6_D$ and $6_N$, and a blank word is transmitted through the OR gate 155. Since the AND gate 180 is blocked at this instant by the signal $\bar{C}$, and address "nought" is transmitted to the switching network. The latter thus receives a blank word having the address 0, which is the word $\tau_1$ of the line *e* of FIG. 3. The word $\tau_1$ is thus re-created artificially.

At the following time slots, the decoder 5' coordinated with the address counter 5 marks the addresses 2, 3, . . ., and the pulse C which as had been observed had a duration equal to that of a time slot, disappears. The plus-minus counter 12 is still set at 1. The gates 152, 153D and 180 are still unblocked and the words present in the delay register 6D are transmitted through the OR gate 155 to the switching network. It has been observed that the address decoder 5' and the address register 5'' then mark the addresses 2, 3 . . . . At this instant however, the flipflop 181 which had been activated by the signal $D_5$, activates the adder 18 which deducts 1 from the addresses 2, 3, . . . it receives from the address register 5''. The word $a_1$ is thus transmitted with the address 1 to the switching network, the word $b_1$ being transmitted with the address 2. All the words present at the addresses 2 to 31 of the frame are thus transmitted by the delay register 6 $_D$ with address numerals decreased by one unit. At the end of the period of delay of a frame imposed by the shift register 122, the plus-minus counter 12 changes to 2 because of the blank word $a_1$. The flipflop 150 is deactivated by the pulse $M_1$ at address 1 of the next frame which begins, and which is delivered by the address decoder 5'. This zero reset has the result of blocking the AND gates 152 and 153D and of unblocking the AND gates 154 and 153N. This results in a shift from the register $6_D$ to the register 6N. The word $a_2$ is transmitted with the address 1.

The address counter 5 shifts to the address 2 and the comparator 8 delivers a pulse C'. The AND gates 152, 154 and 180 are blocked again by the signal $\bar{C}$ at the same time as the signal C reactivates the flipflop 150. It has been observed in the foregoing that the conditions: blocked gates 152, 154 and 180 and signal C in action, corresponded to the transmission of a blank word having the address 0; the word $\tau_2$ is thus transmitted with the address 0 during the second time slot of the period.

During the following time slots, the address counter 5 marks the addresses 3, 4, . . . , and the pulse C which had been observed to have a duration equal to that of a time slot, disappears. The plus-minus counter 12 is still set at 2. The gates 152, 153D and 180 are then unblocked and the wordspresent in the delay register $6_D$ are transmitted through the OR gate 155 to the switching network. It has been noted that the address counter 5 then marks the addresses 3, 4, . . . . At this instant however, the flipflop 181 is in operation and decreases these addresses by one unit. The words $b_2$, $c_2$ are thus transmitted with the addresses 2, 3 to the switching network.

During the following time slots, all the words situated at the addresses 4 to 31 of the period are thus transmitted by the delay register $6_D$ with address numerals decreased by one unit.

It derives from the foregoing that the shifts from the delay register $6_D$ to the normal register $6_N$ are triggered by the pulses M1 of each period and that the shifts from the normal register $6_N$ to the delay register $6_D$ are triggered by the pulses C obtained at the output side of the comparator 8.

After the last partial jump, the plus-minus counter 12 which had marked 31, marks 0 and the decoder 123 coordinated with the plus-minus counter 12 delivers a signal which resets the flipflop 91 to nought, thus causing the signal $D_1$ to disappear. The AND gate 94 is then unblocked and the flipflop 93 is reset to zero.

The relocation of the words in the frame by partial jumps is then completed.

Let us now pass to the case of the signal A. It was observed that in this case, a synchronizing word $\tau_1$, $\tau'_1$ is repeated (line b, FIG. 3). The signal A imposes the state one on the flipflop 92 of the partial jump control circuit 9. This flipflop transmits a signal referred to as $A_1$. The signal $A_1$ imposes the state o n e through the OR gate 71 on the flipflop 70 of the address listing change circuit 7 of controlling the word address counter 5. At the same time, it makes ready for the unblocking of the AND gate 77. The signal $\alpha$ is transmitted by the flipflop 70 to the slot jump control circuit 4, as in the preceding case.

Since the synchronizing word $\tau_1$ is repeated at $\tau'_1$, the word address counter 5 which in the absence of this repetition would have to count the addresses 30, 31, 0, 1 . . . , must supply the addresses 30, 31, 0, 0, 1 . . . since the $\tau$ of each frame are in the address slot 0 of the frame; the address 0 must be repeated, therefore. To this end, the pulse $M_1$ having the address 1 and issuing from the decoder 5' is fed to the AND gate 77 whereof the unblocking is set up by the signals $M_1$ and $\alpha$, and through the OR gate 74 causes the activation of the flipflop 75. This flipflop transmits the signal $D_3$ which resets the flipflop 70. This latter does not unblock the AND gate 73 however because the signal $D_1$ is absent. Accordingly, the address counter 5 is not set to 1. The signal emerging from 77 sets the plus-minus counter 12 at 31 and sets the same to operate by subtraction. Upon deactivation of 70, a signal is transmitted to the delay register 78 which resets the address counter 5.

When the decoder is set to the address 0 (first time), the pulse $M_o$ imposes the state one of the flipflop 157 through the AND gate 156, the AND gate 156 being unblocked by the signal $A_1$. The signal $A_2$ generated by the flipflop 157 unblocks the AND gate 153A which allows of the scanning of the words from the lead register $6_A$ through the OR gate 155. This corresponds to the first shift from $6_N$ to $6_A$ in FIG. 5b. The words $a_1$, $b_1$, $c_1$ are scanned in this register $6_A$ but their addresses must be increase by one unit. To this end, the state one is imposed on the flipflop 182 by the signal $A_2$, causing one unit to be added in the adder 18 to the address received from the address register 5''. The word $a_1$ having the address 0 in $6_A$ is thus transmitted with the address 1, the term $b_1$ having the address 1 in $6_A$ is transmitted with the address 2, and so forth.

When the address counter 5 is set at the address 31, the comparator 8 generates a pulse C' which activates flipflop 80. Flipflop 80 generates a pulse C which deactivates the flipflop 157, which blocks the AND output gate 153A of the lead register $6_A$ and unblocks the AND gate 154 except during the period of the said pule C. A blank term $\tau_2$ is transmitted to the switching network with the address zero (since the gate 180 is blocked), whereupon the following words are scanned in the register $6_N$ without a change in their address.

It is apparent from the foregoing that the shifts from the normal register $6_N$ to the lead register $6_A$ are triggered by the pulses $M_0$ of each frame and that the shifts from the lead register $6_A$ to the normal register $6_N$ are triggered by the pulses C obtained at the output side of flipflop 80 controlled by the comparator 8.

The reset of the address change flipflops 181 and 182 is operated by a signal E delivered by AND gate 158 which receives the signals $\bar{A}_2$ and $\bar{D}_5$.

The delay circuit 14 comes into action at an instant determined by the signal delivered by the OR gate 141 receiving the signal $\overline{A_1 + D_1}$ coming from the partial jump control circuit 9 and the pulse issuing from the AND gate 121.

It is apparent from FIG. 7 that there are several unmarked terminals to which pulses are fed at the frequency of the time slots, one terminal being the input terminal of the registers $6_A$ $6_N$ and $6_D$ having pulses fed to it at the frequency of the bits, and one terminal being the input terminal of the address register 5'', having pulses fed to it at the frequency of the address bits.

The application of the device of the invention to the data transmission networks of the asynchronous type, as has been stated, requires the incorporation of blank words to provide the possibility of partial period jumps. The proportion of blank words as compared to useful words depends on the drift of the clocks. Assuming the clocks to have a bit frequency of 2,048kc/s, or a cycle of approximately 0.5 $\mu$s, and that their relative precision amounts to $10^{-6}$, the drift per second amounts to $$0.5 \times 10^{-6} \times 2 \times 10^{6} \approx 1\ \mu s$$

which corresponds to a jump of one frame having 32 slots of 4 $\mu$s every 4 seconds.

If, as a safety precaution, it is accepted that the 32 partial jumps which are equivalent to the frame jump should occur during half the time separating two frame jumps, or 4/2 = 2 secs., a partial jump should be performed in 2/32=1/16 sec. One blank word per channel is thus required per sixteeth of 1 second. Since the duration of a frame amounts to 125 $\mu$s and since there are $10^6/125 = 500$ slots per channel and per second, the proportion of blank words amounts to one blank word per $$1/16 \times 10^6/125 = 500 \text{ words.}$$

In the general case, several consecutive exchanges are interposed in one connection and their corresponding clocks have drift factors lower than a scheduled value, say $10^{-6}$, that is to say that the relative variations of the frequency of a clock as compared to each of the other clocks cannot exceed $10^{-6}$.

If t denotes half the time separating two frame jumps in an exchange, if use is made of the entire frequency margin (as has been observed, $t = 2$ seconds if the margin amounts to $10^{-6}$), and assuming the frame to comprise $m$ slots, a partial jump is performed during this time on each of the $m$ time channels. The proportion of blank words comes to one blank word during the time interval $t/m$. One only of these time channels is considered in the following, all being taken to be identical in respect of the proportion of blank words they contain.

Each clock has a lead or lag compared to each of the others and it is possible to specify configurations of clocks, that is to say to specify a series of relative advances or retardations between consecutive clocks of exchanges of a transmission line.

The most disadvantageous configurations are the following: configuration No. 1: the clock frequency decreased from exchange No. 1 to exchange No. $(n-1)$ of the line whilst traversing the entire advance margin, then increases from exchange No. $(n-1)$ to exchange No. $n$ whilst traversing the entire retardation margin;

configuration No. 2: the clock frequency decreases from exchange No. 1 to exchange No. 2, then increases from exchange No. 2 to exchange No. 3, decreases from exchange No. 3 to exchange No. 4, and so forth, until it decreases from exchange No. $(n-2)$ to exchange No. $(n-1)$ and increases from exchange No. $(n-1)$ to exchange No. $n$, each variation from one clock to the next taking up the entire frequency margin.

In the first case, $(n-2)$ blank words may have to be used from exchange No. 1 to exchange No. $(n-1)$, and one blank word may have to be used from exchange No. $(n-1)$ to exchange $n$, amounting to $(n-1)$ blank words during the time $t/m$.

In the second case, if $n$ is odd, $(n-1)/2$ blank words may have to be used during the time $t/m$ . Since at least one blank word must remain at exchange No. $(n-1)$, $(n-2)/2+1= (n+1)/2$ blank words will be required during the interval $t/m$ in the final analysis. The probability of a proportion of this magnitude being needed in the two configurations contemplated in the foregoing, will now be calculated.

The probability of a period jump intervening during the time $t/m$, if the entire frequency variation margin of the timers is traversed, amounts to $$p' = (t/m)\,(1/t) = 1/m.$$

In configuration No. 1, the probability of a division jump intervening during the time $t/m$ whilst passing from one exchange to the next during passage in the first $(n-1)$ exchanges, amounts to $$p_i = 1/m \times 1/k_i$$

in which $1/k_i$ represents the fraction of the total margin described whilst passing from the centres $i$ to $i+1$.

If $q_i = 1 - p_i$ is the probability that this division jump will not occur, the probability of at least two division jumps occurring between exchanges Nos 1 and $(n-1)$ is a function of $p_i$ and $q_i$ (with 1 $i$ $n-2$) obtained by circular permutation of the different $p_i$ and $q_i$ values and this function reaches a maximum if $p_1 = p_2 = \ldots = p_i = p_{n-2}$ and $q_2 = q_2 = \ldots = q_i = q_{n-2}$ as known from the sphere of compound probability.

Consequently, the probability $p_i = p = 1/m \times 1/n{-}2$ and the probability of having at least two division jumps during a time $t/m$ in the first $n-1$ exchanges, amounts to $$p = \sum_{j=2}^{j=(n-2)} C^{j}{}_{(n-2)}\, p^{j}\, q^{(n-2-j)}$$

Accordingly, for $n = 10$, P is of the order of 1/40 with $p = 1/(32 \times 8)$. In configuration No. 2, the probability of eliminating blank words among which there would be no repetition of blank words, has the form, in the case in which $n$ is odd:

$$P = (n-3)/2\ p^2 q + (n-5)/2\ p^2 q^3 + (n-7)/2\ p^2 q^5 \ldots + p^2.Q^{n-4}$$

as derived from calculations made by iteration; for example, P = 1/110, for $n = 11$ and $p = 1/\mathbf{32}$.

Making allowance for the relatively low probability that two blank words are used during the same time interval $t/m$ in the most unfavourable configurations Nos. 1 and 2, and for the low probability of these extreme conditions being established, it may be admitted that in the general case, a satisfactory protection will be secured by doubling the proportion of blank words calculated in the foregoing.

If the relative frequency variation margin varies, the proportion of blank words to be included will vary in the same direction.

Accordingly, it is desirable to maintain a satisfactory precision of the timers to retain a satisfactory efficiency in the transmission of data.

We claim:

1. A switchable system for transmission of data words carrying digital information wherein the transmission lines are time-sharing transmission lines comprising time slots grouped in frames, the said frames being identified by synchronizing words or bits in their leading time slot, and the exchanges are time-sharing exchanges wherein the clocks are asynchronous and drift with respect to each other, which in the transmission of data-carrying words introduce repetitions or omissions of synchronizing words and of data-carrying words and retardation or advances by one time slot of the data-carrying words caused by the slot jumps generated in the local exchange when the drift between the clock of the distant exchange originating the data-carrying words and the clock of the local exchange becomes equal to the duration of a time slot of the local clock, the said system comprising means situated at the distant exchange for the transmission of blank words, along each transmission channel and between data-carrying words; first, second and third shift registers situated in cascade at the local exchange, and chronologically staggered with respect to each other by the period of one time slot and adapted to receive the data coming from the distant exchange including blank words; means for scanning the data words carrying digital information; and means for selectively connecting the said scanning means to the said shift registers, the said connecting means rendering it possible to shift from the first shift register to a second shift register in the lead by the period of a time slot over the said first register when a repetition of a synchronizing word is introduced by a slot jump in such manner as to eliminate this repetition, and at each beginning of a frame and to shift from the first shift register to the third shift register trailing by the period of one time slot behind the said first register when an omission of a synchronizing word is introduced by a slot jump in such manner as to cancel this omission, and at each beginning of a frame, and to shift from the said third register to the said first register each time a blank word is received.

2. A system for the switchable transmission of data words carrying digital information wherein the transmission lines are time sharing lines comprising time slots grouped into frames, the said frame being identified by synchronizing words in their leading time slot, and the exchanges are time sharing exchanges wherein the clocks are asynchronous and drift with respect to each other, which in the transmission of data carrying words introduces repetitions or omissions of synchronizing words and of data-carrying words caused by slot jumps produced in the local exchange when the drift between the clock of the distant exchange and the clock of the local exchange becomes equal to the duration of a time slot of the local timer, the said system comprising a plurality of buffer registers intended to receive the words with addresses equal to the sequence number of the time slot they occupy within the frame an address register controlling the addresses of the words received; means for correcting the sequence of addresses supplied by the said address register by repeating the address of a synchronizing word when a repetition occurs of the said synchronizing word as a result of a slot jump and by omitting the address of a synchronizing word when an omission occurs of the said synchronizing word; means situated at the exchange for the transmission of blank words on each transmission line between data-carrying words, three shift registers situated at the local exchange, grouped in cascade, chronologically staggered with respect to each other by the period of a time slot and adapted to receive the data coming from the distant exchange; means for selectively connecting the said buffer registers to the said shift registers, the said connecting means rendering it possible to shift from a first shift register to a second shift register in the lead by the period of a time slot over the said first register when a repetition of a synchronizing word is introduced by a slot jump in such manner as to eliminate this repetition and at each beginning of a frame, and to shift from the said second register to the first register each time a blank word is received on a line, and to shift from the first shift register to the third shift register trailing by the period of a time slot behind the said first register when an omission of a synchronizing word is introduced by a slot jump in such manner as to cancel this omission and at each beginning of a frame, and to shift from the said third register to the said first register each time a blank word is received on a line; and means of increasing by one unit the address of a word supplied by the said address register when the buffer register which is the destination of the said word is connected to the said second register, and of decreasing by one unit the address of a word supplied by the said address register when the buffer register which is the destination of the said word is connected to the said third register.

* * * * *